(12) United States Patent
Hooker et al.

(10) Patent No.: US 11,479,897 B1
(45) Date of Patent: Oct. 25, 2022

(54) LAUNDRY WASHING MACHINE WEIGHT SENSING SYSTEM

(71) Applicant: Midea Group Co., Ltd., Foshan (CN)

(72) Inventors: John Kenneth Hooker, Louisville, KY (US); Alexi Poth, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 17/470,301

(22) Filed: Sep. 9, 2021

(51) Int. Cl.
*D06F 34/18* (2020.01)
*D06F 34/08* (2020.01)
*D06F 34/04* (2020.01)
*D06F 33/48* (2020.01)

(52) U.S. Cl.
CPC .............. *D06F 34/18* (2020.02); *D06F 33/48* (2020.02); *D06F 34/04* (2020.02); *D06F 34/08* (2020.02)

(58) Field of Classification Search
CPC ....................................................... D06F 34/18
See application file for complete search history.

(56) References Cited

U.S. PATENT DOCUMENTS

| | | | |
|---|---|---|---|
| 9,973,138 B2 | 5/2018 | Sengokudani et al. | |
| 10,273,622 B2 | 4/2019 | Hombroek et al. | |
| 10,612,175 B2 | 4/2020 | Hombroek | |
| 10,760,193 B2 | 9/2020 | Balinski et al. | |
| 2012/0005840 A1 | 1/2012 | Jang et al. | |
| 2020/0362496 A1 | 11/2020 | Balinski et al. | |

FOREIGN PATENT DOCUMENTS

| | | |
|---|---|---|
| AU | 2005205788 A9 | 6/2006 |
| BR | PI0902470 A2 | 4/2010 |
| CN | 104894807 B | 7/2018 |
| EP | 2194180 B1 | 11/2013 |
| JP | 2005348804 A | 12/2005 |
| KR | 20080017225 A | 2/2008 |

OTHER PUBLICATIONS

Cypress, F2MC-8FX/16LX/16FX/FR. All Series, BLDC Drive with the PPG , cypress.com, document No. 002-05199 Rev. C, Retrieved from: https://www.cypress.com/file/250991/download, Feb. 6, 2018.
Hombroek et al., U.S. Appl. No. 16/893,328, filed Jun. 4, 2020.

*Primary Examiner* — Jason Y Ko
(74) *Attorney, Agent, or Firm* — Middleton Reutlinger

(57) ABSTRACT

A laundry washing machine includes a weight sensing system including a weight sensor positioned to sense at least a portion of a weight associated with a wash tub and configured to output an associated pulse width modulated (PWM) force signal having a duty cycle that varies with applied force on the weight sensor. A controller of the laundry washing machine includes a state change sensing logic circuit coupled to receive the PWM force signal from the weight sensor and execute an interrupt service routine triggered by each state transition to capture a timestamp associated with each state transition such that the duty cycle of the PWM force signal may be determined using the captured timestamps.

20 Claims, 8 Drawing Sheets

LAUNDRY WASHING MACHINE WEIGHT SENSING SYSTEM

BACKGROUND

Laundry washing machines are used in many single-family and multi-family residential applications to clean clothes and other fabric items. Due to the wide variety of items that may need to be cleaned by a laundry washing machine, many laundry washing machines provide a wide variety of user-configurable settings to control various aspects of a wash cycle such as water temperatures and/or amounts, agitation, soaking, rinsing, spinning, etc. The settings cycle can have an appreciable effect on washing performance, as well as on energy and/or water consumption, so it is generally desirable for the settings used by a laundry washing machine to appropriately match the needs of each load washed by the machine.

Some laundry washing machines also support user selection of load types, typically based on the types of fabrics and/or items in the load. Some laundry washing machines, for example, have load type settings such as colors, whites, delicates, cottons, permanent press, towels, bedding, heavily soiled items, etc. These manually-selectable load types generally represent specific combinations of settings that are optimized for particular load types so that a user is not required to select individual values for each of the controllable settings of a laundry washing machine.

While manual load type selection in many cases simplifies a user's interaction with a laundry washing machine, such manual selection still can lead to suboptimal performance due to, for example, user inattentiveness or lack of understanding. Therefore, a significant need continues to exist in the art for an automated manner of optimizing the performance of a laundry washing machine for different types of loads, as well as reducing the burden on users when interacting with a laundry washing machine.

Automated load type selection in many instances is based at least in part on weight measurements taken of the load, e.g., when the load is dry (prior to soaking the load with water, and in some instances, after water has been dispensed into the wash tub within which the load has been placed. In addition, in some instances, it may be desirable to weigh a load while the load is spinning to account for uneven load dispersal. It has been found, however, that weight sensing can be costly, and in some instances, computationally-intensive, particularly when load cells that output pulse width modulated (PWM) force signals in which the force signals have duty cycles that vary with applied force are used as weight sensors. As such, a need also exists in the art for a more cost-effective and computationally-efficient manner of sensing weight in a laundry washing machine.

SUMMARY

The invention addresses these and other problems associated with the art by providing a laundry washing machine and method that incorporate a weight sensing system that includes a weight sensor positioned to sense at least a portion of a weight associated with a wash tub and configured to output an associated pulse width modulated (PWM) force signal having a duty cycle that varies with applied force on the weight sensor. A controller of the laundry washing machine includes a state change sensing logic circuit coupled to receive the PWM force signal from the weight sensor and execute an interrupt service routine triggered by each state transition to capture a timestamp associated with each state transition such that the duty cycle of the PWM force signal may be determined using the captured timestamps.

Therefore, consistent with one aspect of the invention, a laundry washing machine may include a wash tub disposed within a housing, a weight sensor positioned to sense at least a portion of a weight associated with the wash tub, the weight sensor configured to output an associated pulse width modulated (PWM) force signal having a duty cycle that varies with applied force on the weight sensor, and a controller including a state change sensing logic circuit coupled to receive the PWM force signal from the weight sensor and generate an interrupt in response to each of a plurality of state transitions in the PWM force signal, the controller configured to determine the weight associated with the wash tub using a force value generated from the PWM force signal output by the weight sensor. The controller is configured to generate the force value by executing an interrupt service routine triggered by each interrupt to capture a timestamp associated with each of the plurality of state transitions, and calculating a duty cycle of the PWM force signal using the captured timestamps of the plurality of state transitions.

In some embodiments, the controller includes a processor integrated circuit, and the state change sensing logic circuit includes an input capture unit (ICU) disposed on the processor integrated circuit. Also, in some embodiments, the input capture unit includes a port coupled to receive the PWM force signal and timer, the input capture unit is configured to generate the interrupt in response to detecting a rising or falling edge of the PWM force signal at the port, and the input capture unit is configured to store a current time of the timer in an input capture register as the timestamp in response to detecting the rising or falling edge of the PWM force signal.

In addition, some embodiments may further include a motor configured to rotate a wash basket in the wash tub, the motor further configured to output a speed signal, and a motor speed conditioning circuit coupled to an input of the controller and the output of the motor and configured to condition the speed signal to reduce noise in the speed signal. Further, in some embodiments, the weight sensor is a first weight sensor among a plurality of weight sensors respectively positioned to sense at least a portion of the weight associated with the wash tub and output respective PWM force signals, the input capture unit is a first input capture unit among a plurality of input capture units disposed on the processor integrated circuit and respectively configured to generate interrupts in response to state transitions in the respective PWM force signals, and the interrupt service routine is a first interrupt service routine among a plurality of interrupt service routines respectively associated with the plurality of weight sensors. In some embodiments, the wash tub is supported by a plurality of suspension rods, and each of the plurality of weight sensors is a load cell coupled to a respective suspension rod among the plurality of suspension rods.

In addition, in some embodiments, the controller is configured to calculate the duty cycle of the PWM force signal using the captured timestamps of the plurality of state transitions by tracking each of a current rising edge timestamp, a previous rising edge timestamp, and a falling edge timestamp, determining a period by determining a first difference between the current rising edge timestamp and the previous rising edge timestamp, and determining the duty cycle by determining a second difference between the falling edge timestamp and the previous rising edge timestamp and dividing the second difference by the period. In some embodiments, the interrupt service routine is configured to, in response to a first interrupt associated with a rising edge state transition, store a first timestamp in a rising edge timestamp variable and set a rising edge triggered flag, and in response to a second interrupt associated with a falling edge state transition, store a second timestamp in a falling edge timestamp variable and set a falling edge triggered flag, and tracking each of the current rising edge timestamp, the previous rising edge timestamp, and the falling edge timestamp, determining the period, and determining the duty cycle are performed in a process input capture routine executed by the controller and configured to test each of the rising edge triggered flag and the falling edge triggered flag to determine whether to update any of the current rising edge timestamp, the previous rising edge timestamp, and the falling edge timestamp.

In addition, in some embodiments, the process input capture routine is configured to be executed as a periodic background routine by the controller. Moreover, in some embodiments, the process input capture routine is configured to return a first value in response to determining a new duty cycle during execution of the process input capture routine and to otherwise return a second value that indicates that determination of the new duty cycle is still in progress. In some embodiments, the plurality of state transitions is a first plurality of state transitions, and the controller is further configured to determine a tare weight for the wash tub by determining a plurality of force values over time based upon a plurality of interrupts generated in response to a second plurality of state transitions, and averaging the plurality of force values.

Some embodiments may also include a rotatable wash basket disposed in the wash tub, the plurality of state transitions is a first plurality of state transitions, and the controller is further configured to determine a weight of a load disposed in the wash tub by rotating the rotatable wash basket, determining a plurality of force values over time based upon a plurality of interrupts generated in response to a second plurality of state transitions during rotation of the rotatable wash basket, and averaging the plurality of force values. Moreover, in some embodiments, determining the plurality of force values includes determining the plurality of force values over one or more full rotations of the rotatable wash basket such that averaging of the plurality of force values is taken over the one or more full rotations.

Some embodiments may also include receiving a speed signal from a motor coupled to the wash basket, and determining the plurality of force values over the one or more full rotations of the rotatable wash basket includes accumulating force values for a first rotation of the wash basket until completion of the first rotation is detected using the speed signal, and averaging the accumulated force values. In addition, some embodiments may also include tracking a rotation duration, and determining the plurality of force values over the one or more full rotations of the rotatable wash basket includes accumulating force values for a first rotation of the wash basket until completion of the first rotation is detected using the rotation duration, and averaging the accumulated force values.

In some embodiments, the controller is configured to determine the weight of the load disposed in the wash tub as a dry load weight prior to dispensing water into the wash tub. Moreover, in some embodiments, the controller is configured to determine the weight of the load disposed in the wash tub as a water weight after dispensing water into the wash tub. Also, in some embodiments, the controller is configured to dynamically select a load type using the determined weight of the load, and control a wash or rinse temperature, a wash or rinse water amount, an agitation duration, an agitation stroke, a soak duration, a spin speed, a spin duration, a cycle time, or a number of phase repeats in response to the selected load type. In some embodiments, the controller is configured to detect an out-of-balance condition using the generated force value.

Consistent with another aspect of the invention, a laundry washing machine may include a wash tub disposed within a housing, first and second load cells positioned to sense at least a portion of a weight associated with the wash tub, the first and second load cells configured to output respective first and second pulse width modulated (PWM) force signals having duty cycles that vary with applied force, and a controller including first and second input capture units respectively coupled to receive the first and second PWM force signals from the first and second load cells and generate respective first and second pluralities of interrupts in response to state transitions in the first and second PWM force signals, the controller configured to determine the weight associated with the wash tub using first and second force values generated respectively from the first and second PWM force signals output by the first and second load cells. The controller may also be configured to generate the first force value by executing a first interrupt service routine triggered by the first plurality of interrupts to capture timestamps associated with state transitions of the first PWM force signal and calculating a first duty cycle of the first PWM force signal using the captured timestamps associated with the state transitions of the first PWM force signal, and generate the second force value by executing a second interrupt service routine triggered by the second plurality of interrupts to capture timestamps associated with state transitions of the second PWM force signal and calculating a second duty cycle of the second PWM force signal using the captured timestamps associated with the state transitions of the second PWM force signal.

Other embodiments may include various methods of operating a laundry washing machine utilizing the various operations described above.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
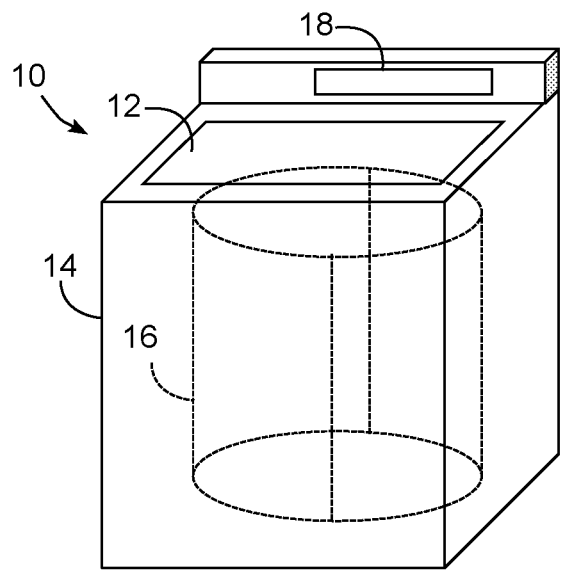
FIG. 1 is a perspective view of a top-load laundry washing machine consistent with some embodiments of the invention.

Embodiments consistent with the invention may be used to sense the weight in a wash tub, wash basket, or other container capable of housing articles to be washed of a laundry washing machine, e.g., in order to automate the selection of a load type for a laundry washing machine, or for other purposes in which weight sensing is desired in connection with the operation of a laundry washing machine. In particular, in some embodiments consistent with the invention, a laundry washing machine may include in part a weight sensing system configured to sense the weight of a wash tub or wash basket using one or more weight sensors (e.g., load cells) that output variable duty cycle signals representative of applied force, such that one or more weights sensed by the weight system may be incorporated into a decision algorithm used to determine a load type and/or otherwise configure one or more operational settings of a laundry washing machine when performing a wash cycle.

In this regard, a load type may be considered to represent one of a plurality of different characteristics, categories, classes, subclasses, etc. that may be used to distinguish different loads from one another, and for which it may be desirable to define particular operational settings or combinations of operational settings for use in washing loads of that particular load type. In the illustrated embodiment, load types are principally distinguished based upon different fabric types (e.g., natural, cotton, wool, silk, synthetic, polyester, permanent press, wrinkle resistant, blends, etc.), and optionally, based on different article types (e.g., garments, towels, bedding, delicates, etc.). It will be appreciated, however, that load types may be defined based upon additional or alternative categorizations, e.g., color (colors, darks, whites, etc.); durability (delicates, work clothes, etc.), soil level (lightly soiled, normally soiled, heavily soiled loads, etc.), among others. Load types may also represent categories of loads that are unnamed, and that simply represent a combination of characteristics for which certain combinations of operational settings may apply, particularly as it will be appreciated that some loads may be unsorted and may include a combination of different items that themselves have different characteristics. Therefore, in some embodiments, a load type may be associated with a combination of operational settings that will be applied to a range of different loads that more closely match that load type over other possible load types.

An operational setting, in this regard, may include any number of different configurable aspects of a wash cycle performed by a laundry washing machine including, but not limited to, a wash water temperature, a rinse water temperature, a wash water amount, a rinse water amount, a speed or stroke of agitation during washing and/or rinsing, a spin speed, whether or not agitation is used during washing and/or rinsing, a duration of a wash, rinse, soak, or spin phase of a wash cycle, a number of repeats of a wash, rinse, soak or spin phase, selection between different rinse operation types such as a spray rinse operation or a deep fill rinse operation, pre-treatment such as soaking over time with a prescribed water temperature and specific agitation stroke, etc.

Numerous variations and modifications will be apparent to one of ordinary skill in the art, as will become apparent from the description below. Therefore, the invention is not limited to the specific implementations discussed herein.

Turning now to the drawings, wherein like numbers denote like parts throughout the several views, FIG. 1 illustrates an example laundry washing machine 10 in which the various technologies and techniques described herein may be implemented. Laundry washing machine 10 is a top-load washing machine, and as such includes a top-mounted door 12 in a cabinet or housing 14 that provides access to a vertically-oriented wash tub 16 housed within the cabinet or housing 14. Door 12 is generally hinged along a side or rear edge and is pivotable between the closed position illustrated in FIG. 1 and an opened position (not shown). When door 12 is in the opened position, clothes and other washable items may be inserted into and removed from wash tub 16 through an opening in the top of cabinet or housing 14. Control over washing machine 10 by a user is generally managed through a control panel 18 disposed on a backsplash and implementing a user interface for the washing machine, and it will be appreciated that in different washing machine designs, control panel 18 may include various types of input and/or output devices, including various knobs, buttons, lights, switches, textual and/or graphical displays, touch screens, etc. through which a user may configure one or more settings and start and stop a wash cycle.

Figure 2:
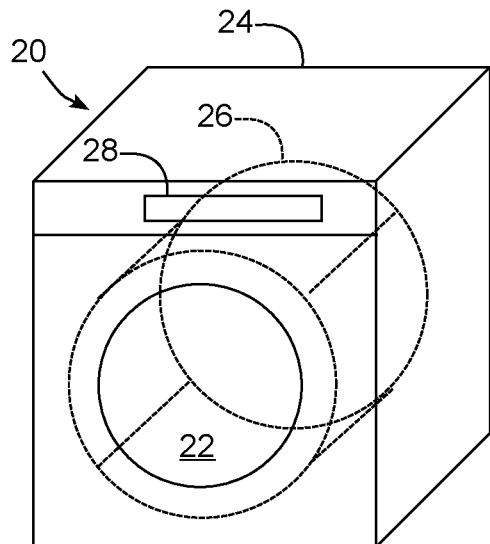
FIG. 2 is a perspective view of a front-load laundry washing machine consistent with some embodiments of the invention.

The embodiments discussed hereinafter will focus on the implementation of the hereinafter-described techniques within a top-load residential laundry washing machine such as laundry washing machine 10, such as the type that may be used in single-family or multi-family dwellings, or in other similar applications. However, it will be appreciated that the herein-described techniques may also be used in connection with other types of laundry washing machines in some embodiments. For example, the herein-described techniques may be used in commercial applications in some embodiments. Moreover, the herein-described techniques may be used in connection with other laundry washing machine configurations. FIG. 2, for example, illustrates a front-load laundry washing machine 20 that includes a front-mounted door 22 in a cabinet or housing 24 that provides access to a horizontally-oriented wash tub 26 housed within the cabinet or housing 24, and that has a control panel 28 positioned towards the front of the machine rather than the rear of the machine as is typically the case with a top-load laundry washing machine. Implementation of the herein-described techniques within a front-load laundry washing machine would be well within the abilities of one of ordinary skill in the art having the benefit of the instant disclosure, so the invention is not limited to the top-load implementation discussed further herein.

Figure 3:
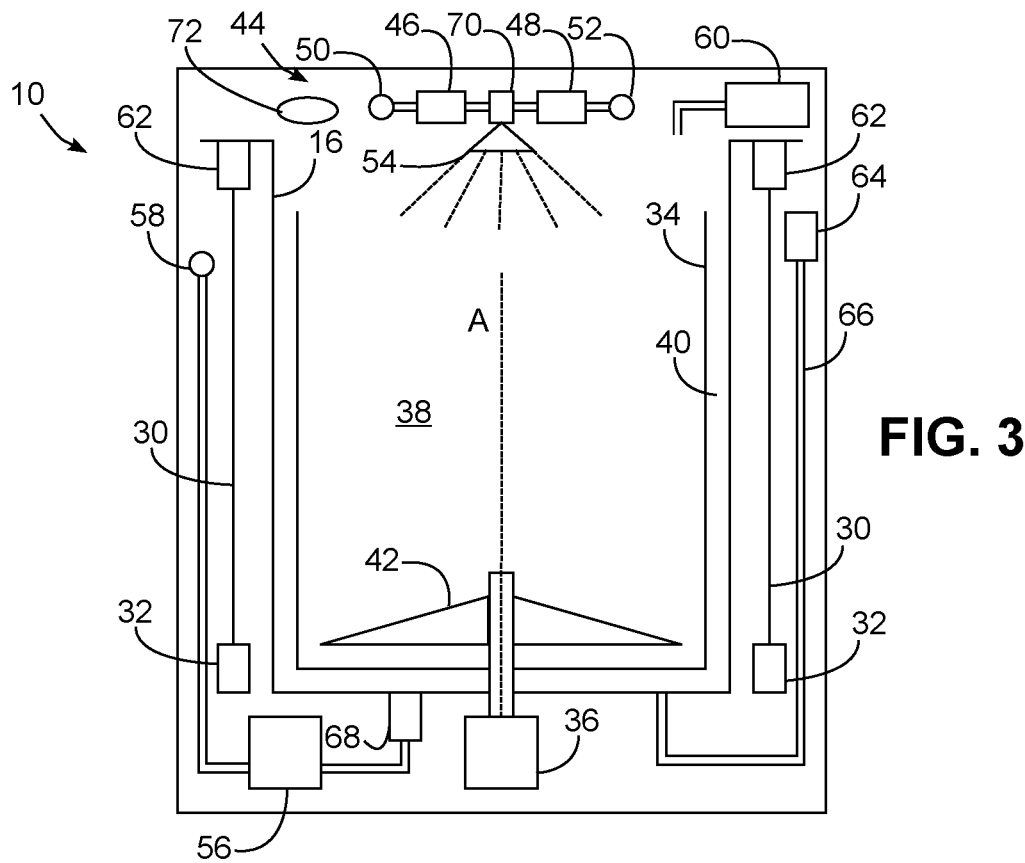
FIG. 3 is a functional vertical section of the laundry washing machine of FIG. 1.

FIG. 3 functionally illustrates a number of components in laundry washing machine 10 as is typical of many washing machine designs. For example, wash tub 16 may be vertically oriented, generally cylindrical in shape, opened to the top and capable of retaining water and/or wash liquor dispensed into the washing machine. Wash tub 16 may be supported by a suspension system such as a set of support rods 30 with corresponding vibration dampening springs 32.

Disposed within wash tub 16 is a wash basket 34 that is rotatable about a generally vertical axis A by a drive system 36. Wash basket 34 is generally perforated or otherwise provides fluid communication between an interior 38 of the wash basket 34 and a space 40 between wash basket 34 and wash tub 16. Drive system 36 may include, for example, an electric motor and a transmission and/or clutch for selectively rotating the wash basket 34. In some embodiments, drive system 36 may be a direct drive system, whereas in other embodiments, a belt or chain drive system may be used.

In addition, in some embodiments an agitator 42 such as an impeller, auger or other agitation element may be disposed in the interior 38 of wash basket 34 to agitate items within wash basket 34 during a washing operation. Agitator 42 may be driven by drive system 36, e.g., for rotation about the same axis as wash basket 34, and a transmission and/or clutch within drive system 36 may be used to selectively rotate agitator 42. In other embodiments, separate drive systems may be used to rotate wash basket 34 and agitator 42.

A water inlet 44 may be provided to dispense water into wash tub 16. In some embodiments, for example, hot and cold valves 46, 48 may be coupled to external hot and cold water supplies through hot and cold inlets 50, 52, and may output to one or more nozzles 54 to dispense water of varying temperatures into wash tub 16. In addition, a pump system 56, e.g., including a pump and an electric motor, may be coupled between a low point, bottom or sump in wash tub 16 and an outlet 58 to discharge greywater from wash tub 16. In some embodiments, it may be desirable to utilize multiple nozzles 54, and in some instances, oscillating nozzles 54, such that water dispensed into the wash tub is evenly distributed over the top surface of the load. As will become more apparent below, in some instances, doing so may maximize the amount of water absorbed by the load prior to water reaching the bottom of the wash tub and being sensed by a fluid level sensor.

In some embodiments, laundry washing machine 10 may also include a dispensing system 60 configured to dispense detergent, fabric softener and/or other wash-related products into wash tub 16. Dispensing system 60 may be configured in some embodiments to dispense controlled amounts of wash-related products, e.g., as may be stored in a reservoir (not shown) in laundry washing machine 10. In other embodiments, dispensing system 60 may be used to time the dispensing of wash-related products that have been manually placed in one or more reservoirs in the machine immediately prior to initiating a wash cycle. Dispensing system 60 may also, in some embodiments, receive and mix water with wash-related products to form one or more wash liquors that are dispensed into wash tub 16. In still other embodiments, no dispensing system may be provided, and a user may simply add wash-related products directly to the wash tub prior to initiating a wash cycle.

It will be appreciated that the particular components and configuration illustrated in FIG. 3 is typical of a number of common laundry washing machine designs. Nonetheless, a wide variety of other components and configurations are used in other laundry washing machine designs, and it will be appreciated that the herein-described functionality generally may be implemented in connection with these other designs, so the invention is not limited to the particular components and configuration illustrated in FIG. 3.

Further, to support automated load type selection or otherwise to support automated selection of various operational settings, laundry washing machine 10 also includes a weight sensing system, and optionally various additional sensors such as a fluid level sensor, a turbidity sensor, a flow sensor, a color detection sensor, etc., as will be discussed in greater detail below. A weight sensing system may be used to sense the mass or weight of the contents of wash tub 16, e.g., when the wash tub is filled with water or even prior to filling the wash tub. In the illustrated embodiment, for example, a weight sensing system consistent with the invention may be implemented in laundry washing machine 10 at least in part using one or more weight sensors 62 that support wash tub 16 on one or more corresponding support rods 30. Each weight sensor 62 may be an electro-mechanical sensor that outputs a signal that varies with a displacement based on applied force (here, also representative of load or weight), and thus outputs a signal that varies with the weight of the contents of wash tub 16. Multiple weight sensors 62 may be used in some embodiments, and in some embodiments, the weight sensors may be implemented using load cells, while in other embodiments, other types of transducers or sensors that generate a signal that varies with applied force, e.g., strain gauges, may be used. Furthermore, while weight sensors 62 are illustrated as supporting wash tub 16 on support rods 30, the weight sensors may be positioned elsewhere in a laundry washing machine to generate one or more signals that vary in response to the weight of the contents of wash tub 16. In some embodiments, for example, transducers may be used to support an entire laundry washing machine, e.g., one or more feet of a machine. Other types and/or locations of transducers suitable for generating a signal that varies with the weight of the contents of a wash tub will be apparent to one of ordinary skill in the art having the benefit of the instant disclosure. In addition, in some embodiments, a weight sensing system may also be used for vibration sensing purposes, e.g., to detect excessive vibrations resulting from an out-of-balance load. In other embodiments, however, no vibration sensing may be used, while in other embodiments, separate sensors may be used to sense vibrations. Further, in some embodiments, a single weight sensor employing a load cell or other transducer may be used (e.g., disposed proximate a corner of the housing), and the wash basket may be rotated when sensing the weight of the load such that a weight may be determined by averaging multiple force values captured during rotation of the wash basket. As will be discussed in greater detail below, a weight sensing system in some embodiments may include one or more weight sensors that output force signals that vary in terms of duty cycle based upon applied force, although in other embodiments other types of weight sensors may be used.

A fluid level sensor may be used in some embodiments to generate a signal that varies with the level or height of fluid in wash tub 16. In the illustrated embodiment, for example, a fluid level sensor may be implemented using a pressure sensor 64 in fluid communication with a low point, bottom or sump of wash tub 16 through a tube 66 such that a pressure sensed by pressure sensor 64 varies with the level of fluid within the wash tub. It will be understood that the addition of fluid to the wash tub will generate a hydrostatic pressure within the tube that varies with the level of fluid in the wash tub, and that may be sensed, for example, with a piezoelectric or other transducer disposed on a diaphragm or other movable element. It will be appreciated that a wide variety of pressure sensors may be used to provide fluid level sensing, including, among others, combinations of pressure switches that trigger at different pressures. It will also be appreciated that fluid level in the wash tub may also be sensed using various non-pressure based sensors, e.g., optical sensors, laser sensors, etc.

Additional sensors may also be incorporated into laundry washing machine 10. For example, in some embodiments, a turbidity sensor 68 may be used to measure the turbidity or clarity of the fluid in wash tub 16, e.g., to sense the presence or relative amount of various wash-related products such as detergents or fabric softeners and/or to sense the presence or relative amount of soil in the fluid. Further, in some embodiments, turbidity sensor 68 may also measure other characteristics of the fluid in wash tub 16, e.g., conductivity and/or temperature. In other embodiments, separate sensors may be used to measure turbidity, conductivity and/or temperature, and further, other sensors may be incorporated to measure additional fluid characteristics. In other embodiments, no turbidity sensor may be used.

In addition, in some embodiments, a flow sensor 70 such as one or more flowmeters may be used to sense an amount of water dispensed into wash tub 16. In other embodiments, however, no flow sensor may be used. Instead, water inlet 44 may be configured with a static and regulated flow rate such that the amount of water dispensed is a product of the flow rate and the amount of time the water is dispensed. Therefore, in some embodiments, a timer may be used to determine the amount of water dispensed into wash tub 16.

In some instances a color detection sensor 72 may be used to capture color composition data of one or more items of a load. In some embodiments, the color detection sensor 72 may be positioned to capture the color composition data as items are added to the wash tub 16. In some embodiments, the color detection sensor 72 may be an image sensor, or a camera.

Figure 4:
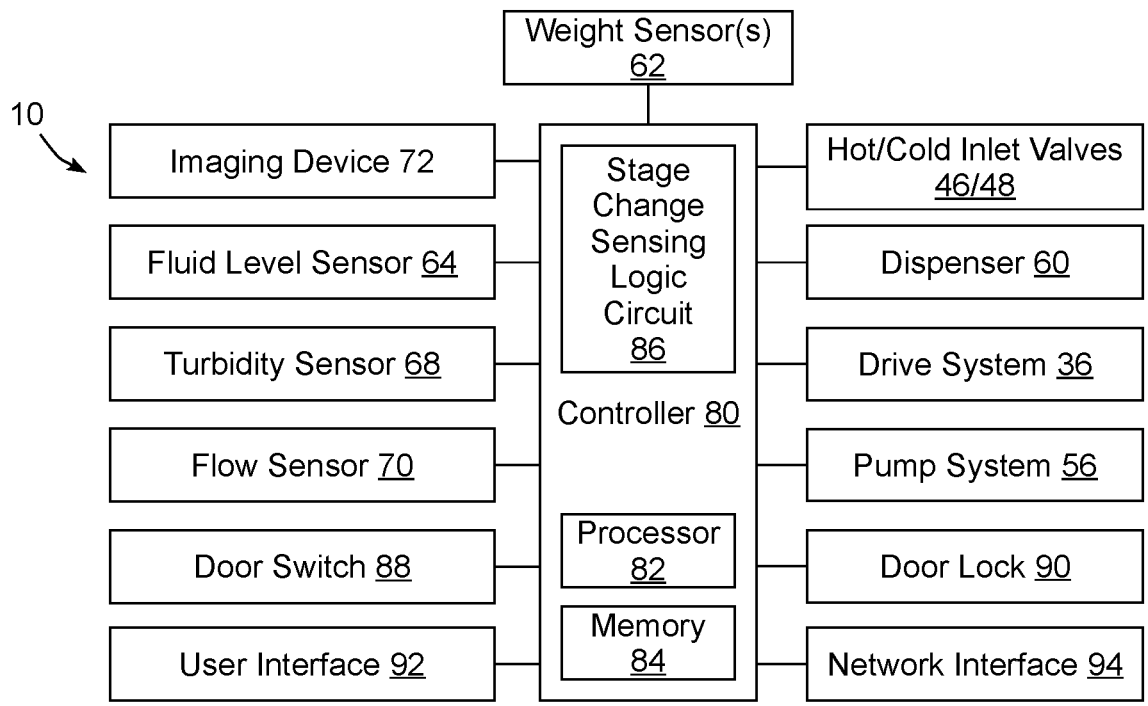
FIG. 4 is a block diagram of an example control system for the laundry washing machine of FIG. 1.

Now turning to FIG. 4, laundry washing machine 10 may be under the control of a controller 80 that receives inputs from a number of components and drives a number of components in response thereto. Controller 80 may, for example, include one or more processors 82 and a memory 84 within which may be stored program code for execution by the one or more processors. The memory may be embedded in controller 80, but may also be considered to include volatile and/or non-volatile memories, cache memories, flash memories, programmable read-only memories, read-only memories, etc., as well as memory storage physically located elsewhere from controller 80, e.g., in a mass storage device or on a remote computer interfaced with controller 80. Controller 80 may also be implemented as a microcontroller in some embodiments, and as such these terms are used interchangeably herein. Controller 80 may also include specialized circuit logic in some embodiments, which may be integrated into one or more integrated circuits in some embodiments, including into an integrated circuit that also incorporates one or more processors and/or memory (also referred to herein as a processor integrated circuit) and/or which may be separate from any integrated circuit (e.g., including logic circuitry on the same or a different module or circuit board). While a wide variety of specialized circuit logic may be incorporated in different embodiments based upon the particular needs of a given laundry washing machine design, in the illustrated embodiment controller 80 includes a state change sensing logic circuit 86, e.g., one or more input capture units (ICUs) capable of generating interrupts in response to detected state changes in digital signals received by one or more ports or pins of the controller.

As shown in FIG. 4, controller 80 may be interfaced with various components, including the aforementioned drive system 36, hot/cold inlet valves 46, 48, pump system 56, weight sensor(s) 62, fluid flow sensor 64, turbidity sensor 68, and flow sensor 70. In addition, controller 80 may be interfaced with additional components such as a door switch 86 that detects whether door 12 is in an open or closed position and a door lock 88 that selectively locks door 12 in a closed position. Moreover, controller 80 may be coupled to a user interface 90 including various input/output devices such as knobs, dials, sliders, switches, buttons, lights, textual and/or graphics displays, touch screen displays, speakers, image capture devices, microphones, etc. for receiving input from and communicating with a user. In some embodiments, controller 80 may also be coupled to one or more network interfaces 92, e.g., for interfacing with external devices via wired and/or wireless networks such as Ethernet, Bluetooth, NFC, cellular and other suitable networks, including external devices such as end user computers, mobile phones, tablets, etc. and/or one or more cloud services. Additional components may also be interfaced with controller 80, as will be appreciated by those of ordinary skill having the benefit of the instant disclosure. Moreover, in some embodiments, at least a portion of controller 80 may be implemented externally from a laundry washing machine, e.g., within a mobile device, a cloud computing environment, etc., such that at least a portion of the functionality described herein is implemented within the portion of the controller that is externally implemented.

In some embodiments, controller 80 may operate under the control of an operating system and may execute or otherwise rely upon various computer software applications, components, programs, objects, modules, data structures, etc. In addition, controller 80 may also incorporate hardware logic to implement some or all of the functionality disclosed herein. Further, in some embodiments, the sequences of operations performed by controller 80 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Weight Sensing System

Some automated load type selection algorithms, e.g., including but not limited to those disclosed in U.S. Pat. Nos.

10,273,622 and 10,612,175, as well as U.S. patent application Ser. No. 16/893,328, filed on Jun. 4, 2020 by Hombroek et al. (all of which are assigned to Midea Group Co., Ltd. and are incorporated by reference herein), rely at least in part on weight sensing in order to select a load type or to otherwise configured operational settings for a laundry washing machine. In some such algorithms, a wash basket is rotated at a slow speed while filling with spray nozzles that evenly douse the fabrics with water at a slow rate in order saturate them as evenly as possible. During this process, the total wash tub weight may be measured with one or more weight sensors (e.g., load cells) placed on one or more suspension rods supporting the wash tub (or in other locations suitable for sensing weight). In some instances, the unabsorbed water level is also measured with a pressure sensor so that the amount of water absorbed by the load may be determined.

In one example algorithm, after an initial taring to compensate for the weight of the empty wash tub, a motor begins rotating the basket in the wash tub and the weight sensor(s) measure the total dry weight of the load followed by one or more additional weight measurements as water is dispensed into the wash tub. A pressure sensor measures only the unabsorbed water, and using these inputs an absorption ratio can be deduced and used to select a fabric type, e.g., cottons, polyesters, or mixed. In addition, in some instances, after a fabric type is detected, additional water may be dispensed into the basket and the weight sensor(s) may be used to measure dry weight of the fabrics against the weight of both wet fabrics and water to deduce the amount of water used in the wash cycle.

It has been found, however, that measuring weight in both static (non-rotating) conditions as well as during a fill when the basket is slowly spinning, can be problematic. An imbalance in the load may cause the output of each weight sensor to fluctuate due to its offset placement relative to the axis of rotation (e.g., when positioned on one of the suspension rods). Furthermore, some types of load cells used as weight sensors are designed to output a pulse width modulated (PWM) force signal that varies in duty cycle with the applied force sensed by the load cell, e.g., with a duty cycle range of about 5% to about 95%. In addition, it has been found that, for many of such load cells, the PWM force signal frequency is not precise, e.g., with a nominal frequency of about 488 Hz that can vary by +/−5%.

In contrast with an analog-type signal, e.g., having a magnitude that varies with weight, a PWM force signal generally cannot be measured simply using on-demand polling of an analog to digital converter as is found on many typical microcontrollers capable of being used as laundry washing machine controllers. Instead, measurement of the duty cycle of a PWM force signal generally requires far more computational overhead in order to measure state transitions in the PWM force signal over time. As such, it is generally desirable to minimize the computational overhead of such measurements in order to enable a laundry washing machine controller ample bandwidth to handle other responsibilities, e.g., communicating with the user interface, communicating with the motor controller, performing safety checks, etc.

In embodiments consistent with the invention, however, a weight sensing system may utilize a state change sensing logic circuit, e.g., an input capture unit (ICU) on a processor integrated circuit of a controller or microcontroller, to sense changes in state of a PWM force signal output by a weight sensor. The ICU may have an associated timer (which may be dedicated to the ICU or shared by multiple ICUs) and may trigger an interrupt in a controller or microcontroller when the ICU detects a change in state, e.g., a rising edge and/or falling edge. The ICU may have an input capture register (ICR) that stores the timestamp, as well as an interrupt flag (ICU/IRQ) that is set in order to trigger an interrupt and that is cleared once the interrupt has been handled, and the interrupt may be used to initiate an Interrupt Service Routine (ISR) that records the timestamp for each rising and/or falling edge. In some embodiments, from these recorded timestamps, the period of the PWM force signal may be determined, for example, by subtracting the timestamp of the previous rising edge from that of the current rising edge, and the duty cycle of the PWM force signal may be determined, for example, by subtracting the timestamp of the previous rising edge from that of the most recent falling edge and dividing the difference by the period.

Thus, in some embodiments of the invention, a laundry washing machine may include a wash tub disposed within a housing, one or more weight sensors positioned to sense at least a portion of a weight associated with the wash tub, and a controller that is configured to determine the weight associated with the wash tub using force signals received from the one or more weight sensors. Each weight sensor may be configured to output an associated pulse width modulated (PWM) force signal having a duty cycle that varies with applied force on the weight sensor, and the controller may include one or more ICUs, each of which being coupled to receive the PWM force signal from a corresponding weight sensor and generate an interrupt in response to each of a plurality of state transitions in the PWM force signal. In addition, as will become more apparent below, the controller may be configured to determine the weight associated with the wash tub using one or more force values generated from the one or more PWM force signal output by the one or more weight sensor, with each force value calculated at least in part by executing an interrupt service routine triggered by each interrupt of a corresponding ICU to capture a timestamp associated with each of the plurality of state transitions of the corresponding PWM force signal, and calculating a duty cycle of the corresponding PWM force signal using the captured timestamps of the plurality of state transitions. It will also be appreciated that a force value in some embodiments may include any value that varies with the applied force to which a weight sensor or load cell is subjected, and may be represented in a number of forms, including in terms of duty cycle as a percent of signal period or a duration, or in some instances a scaled value in units of force, mass or weight, among other representations. In the discussion hereinafter, for example, the force values are represented by duty cycle values as a percentage of the PWM force signal period.

As will also become more apparent below, such a technique may also be used to record multiple force values (also referred to herein as readings) over one or more basket rotations, while still allowing a controller to be available for other processing tasks. Further, in some embodiments, the appropriate number of readings corresponding to a single basket rotation may be taken by tracking the number of pulses per rotation (N) received from a motor that drives the basket, such that once the number of readings is equivalent to or exceeds the number of pulses in a full basket rotation, an average of all of the readings taken during the rotation can be used to determine weight.

In some embodiments, weight sensor output frequency may also be measured before commencing with basket rotation and fill and used to determine the number of readings to collect in order to determine an average weight over one or more full basket rotations. For example, assume that the frequency of a weight sensor's PWM force signal measures 500 Hz (2 milliseconds). If the basket rotation takes 2.5 secs at the desired speed, 2.5/0.002=1250 weight sensor readings may be averaged together to represent the average basket weight during the rotation.

Also, in some embodiments, it may be desirable to adjust the motor speed slightly to match the measured frequency of a PWM force signal so that the number of readings stays the same. In other embodiments, however, the motor speed may be kept constant and the number of weight sensor readings corresponding to a full rotation may be adjusted. In still other embodiments, weight sensor readings over the known time of a basket rotation may be accumulated during basket rotation and the accumulated value may be divided by the count of readings taken during the rotation.

In the above-described approaches, it is generally a requirement that the motor speed be tightly controlled so that the weight sensor readings are averaged over a complete rotation. In other embodiments, however, motor speed feedback information (e.g., from a shaft mounted speed sensor) may be used to determine relative basket rotational position based upon a known motor to basket pulley ratio. In so doing, the need for tight control of motor & basket speed may generally be avoided.

It will be appreciated that weight sensing may be useful in other applications within a laundry washing machine beyond load or fabric type determinations. For example, weight sensing may be used in some instances in connection with determining load size or determining when to stop a fill operation, particularly for abnormal loads for which conventional techniques are unreliable or lead to overfilling. As another example, weight sensing may be used to detect out-of-balance conditions. As such, the invention is not limited to the use of the herein-described weight sensing system specifically for the purpose of determining load type.

Figure 5:
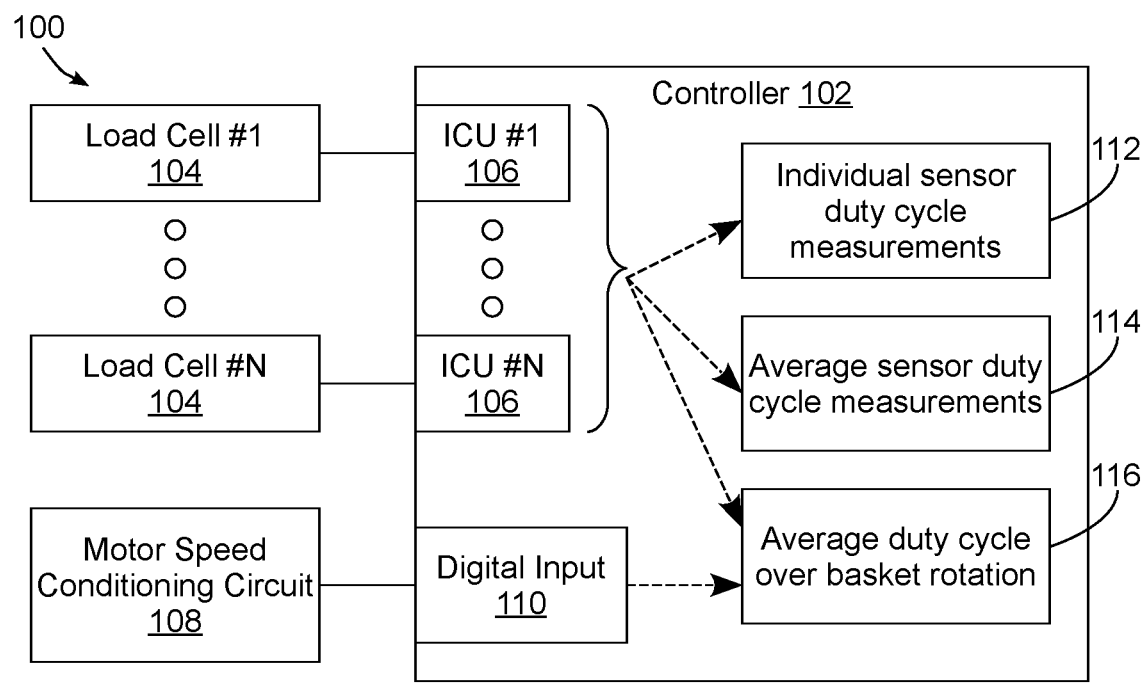
FIG. 5 is a block diagram of an example weight sensing system for use in a laundry washing machine consistent with some embodiments of the invention.

Now turning to FIG. 5, an example weight sensing system 100 for a laundry washing machine is illustrated in greater detail. Weight sensing system 100 includes a controller 102 interfaced with a plurality of weight sensors 104 (herein implemented as load cells 1 . . . N), and state change sensing logic circuit (e.g., a corresponding number (1 . . . N) of input capture units (ICUs) 106) in controller 102 is used to receive PWM force signals output by the weight sensors 104. In addition, in the illustrated embodiment, a motor speed condition circuit 108 is interfaced with controller 102 through a digital input 110 (e.g., a pin or port) to receive a speed signal output by the motor used to rotate the wash basket. As illustrated in FIG. 5, controller 102 may also include functionality, e.g., implemented in program instructions to perform various weight sensing operations, including operations to generate individual sensor duty cycle measurements (block 112), to generate averages of multiple sensor duty cycle measurements (block 114), and to generate an average duty cycle over one or more basket rotations (block 116), with blocks 112 and 114 relying on PWM force signals received by ICUs 1 . . . N 106 and with block 116 additionally relying on a speed signal received by digital input 110.

Figure 6:
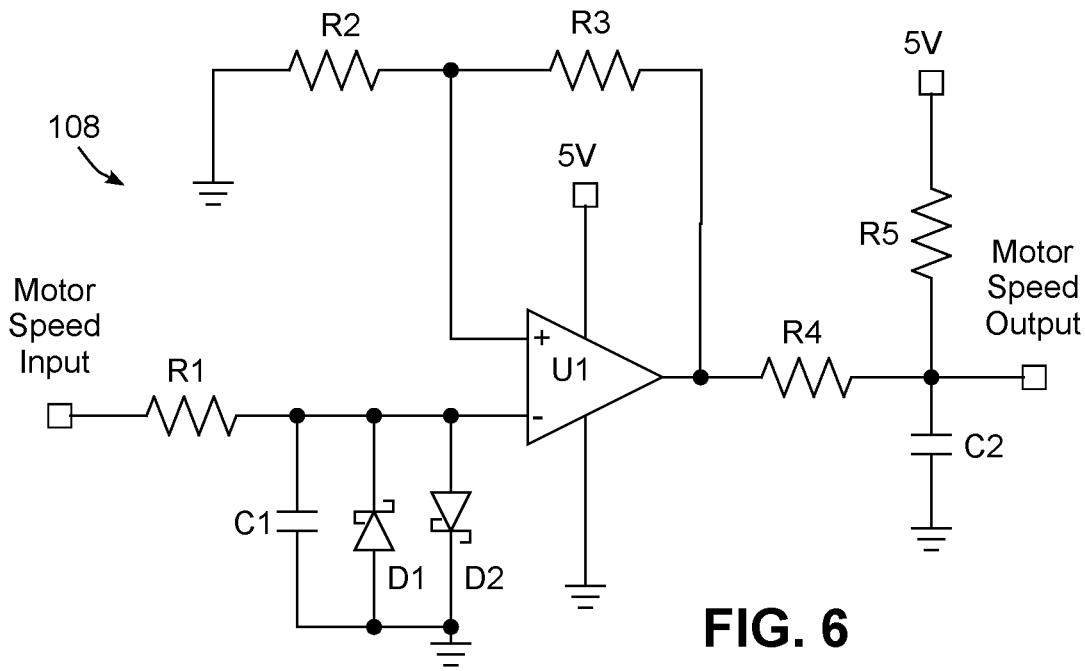
FIG. 6 is a circuit diagram of the motor speed conditioning circuit referenced in FIG. 5.

FIG. 6 illustrates an example implementation of motor speed conditioning circuit 108 that is suitable for use in some embodiments. For this design, it is assumed that the motor has a pick-up coil at the opposite drive end bearing that outputs 4 or 8 pulses (depending on model) per rotation. The pick-up coil produces a roughly sinusoidal voltage that is speed dependent, e.g., between about 1V at very low speed to about 30V at high speed, which is received at the motor speed input and coupled to a negative input of an op-amp U1 configured in a comparator circuit through a resistor R1, with the positive input of op-amp U1 coupled to ground through a resistor R2 and to the output through a resistor R3. The pick-up coil is generally not capable of supporting much load, and as such R1 provides a relatively high circuit input impedance (e.g., R1=1 MOhm). The negative input of op-amp U1 is also coupled to ground through a capacitor C1 (e.g., C1=100 nF) to filter noise from the signal, and a pair of Schottky diodes D1 and D2 are also coupled in opposite orientations between the op-amp U1 negative input and ground to protect the input. R2 (e.g., R2=1 kOhm) and R3 (e.g., R3=1 MOhm) to provide a small hysteresis to avoid chatter at zero crossings. The output of op-amp U1 is coupled to the digital input as a motor speed output signal through a resistor R4 (e.g., R4=100 Ohm), and the digital input is also coupled to VCC through resistor R5 (e.g., R5=1 kOhm) and to ground through capacitor (e.g., C1=10 nF).

Figure 7:
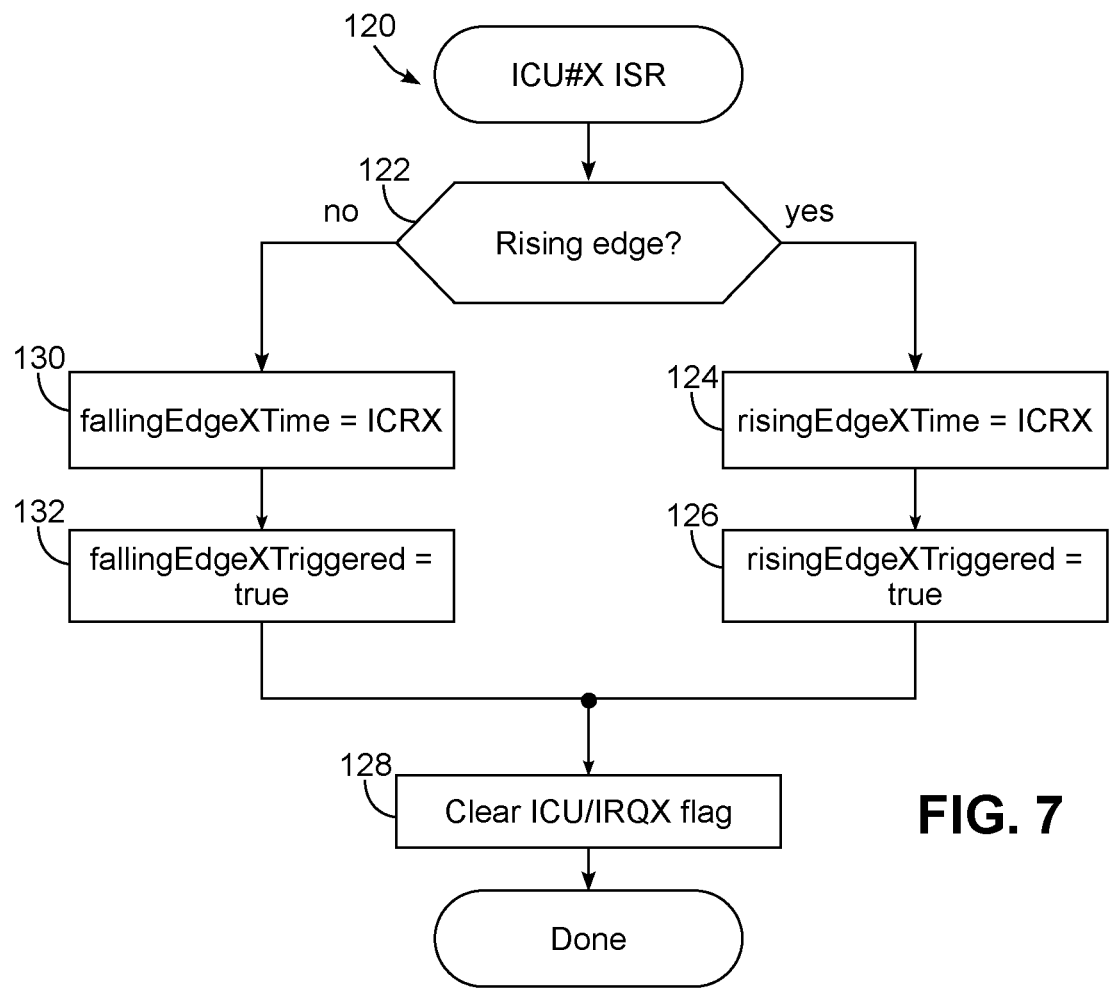
FIG. 7 is a flowchart illustrating an example sequence of operations for an interrupt service routine capable of being used in the weight sensing system of FIG. 5.

Now turning to FIG. 7, controller 102 is configured to execute one or more interrupt service routines (ISRs) 120, each corresponding to a particular load cell/ICU, and each configured to manage a set of global variables and flags for its associated load cell/ICU. While in some embodiments, only a single load cell/ICU may be used (i.e., N=1), in other embodiments two, three, four or more load cells/ICUs may be used, and in such instances, it may be desirable to utilize a dedicated ISR for each load cell/ICU.

For the ISR 120 for load cell/ICU X (X=1 . . . N), for example, a fallingEdgeXTime variable and a risingEdgeXTime variable are respectively used to store a falling edge timestamp and a rising edge timestamp captured by an input capture register (ICR), e.g., ICRX for load cell/ICU X, while a risingEdgeXTriggered flag and a fallingEdgeXTriggered flag are respectively used to indicate when a new rising edge/falling edge timestamp has been captured. An ICU/IRQX flag is used to signal the interrupt for load cell/ICU X, and is cleared when the interrupt has been handled by the ISR. Each ICU therefore may, upon detecting a state change (either a falling edge or a rising edge in the corresponding PWM force signal) write a timestamp value into its ICR and then set its ICU/IRQ flag to initiate the interrupt, causing execution of ISR 120.

ISR 120 begins in block 122 by determining first whether the state transition is a rising or falling edge. If the interrupt is for a rising edge, control passes to block 124 to set the risingEdgeXTime variable to the timestamp stored in ICRX, and then to block 126 to set the risingEdgeXTriggered flag to true. Control then passes to block 128 to clear the ICU/IRQX flag to indicate that the interrupt has been handled, and the routine is complete. Returning to block 122, if the interrupt is for a falling edge, control instead passes to block 130 to set the fallingEdgeXTime variable to the timestamp stored in ICRX, and then to block 132 to set the fallingEdgeXTriggered flag to true. Control then passes to block 128 to clear the ICU/IRQX flag to indicate that the interrupt has been handled, and the routine is complete.

Figure 8:
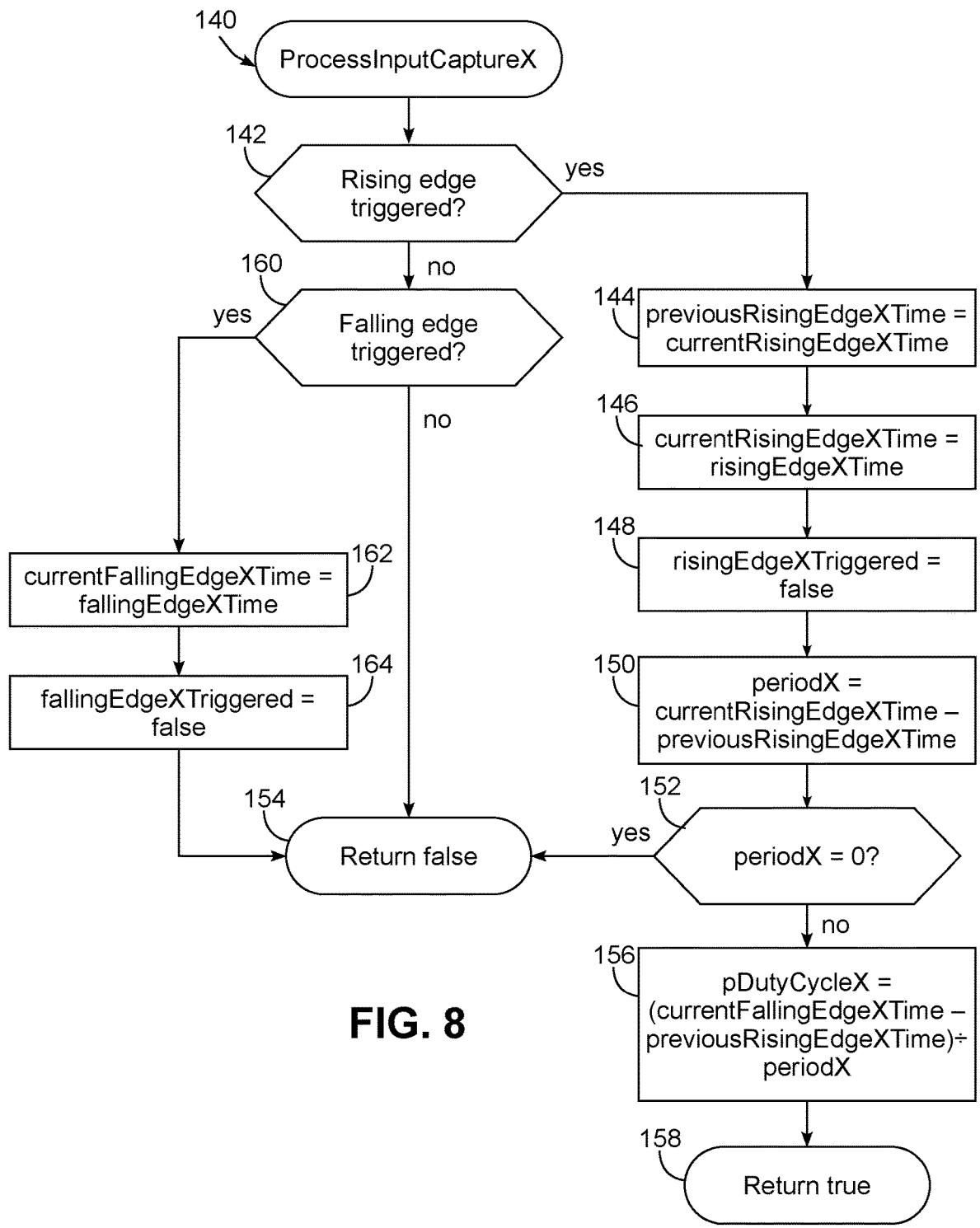
FIG. 8 is a flowchart illustrating an example sequence of operations for a process input capture routine capable of being used in the weight sensing system of FIG. 5.

FIG. 8 next illustrates a ProcessInputCaptureX routine 140 that in some embodiments may be configured to run as a periodic background routine (e.g., in a background thread or process) on controller 102 to periodically check the risingEdgeXTriggered and fallingEdgeXTriggered flags for an associated load cell/ICU X and calculate new readings as new timestamps are captured. Each routine 140 also manages five additional variables, including previousRisingEdgeXTime, currentRisingEdgeXTime and currentFallingEdgeXTime variables that store the two most recent rising edge timestamps and most recent falling edge timestamp, as well as a periodX variable that stores the most recent period calculation and a pDutyCycleX variable that stores the most recent duty cycle calculation.

Routine 140 may also be configured to return a true or false value, with true indicating that a new reading has been calculated, and false indicating otherwise. First, in block 142 the risingEdgeXTriggered flag is tested to determine if a new rising edge timestamp has been logged, and if so, control passes to block 144 to move the timestamp stored in the currentRisingEdgeXTime variable into the previousRisingEdgeXTime variable and then to block 146 to move the timestamp in the risingEdgeXTime variable managed by the corresponding ISR 120 into the currentRisingEdgeXTime variable. Block 148 then clears the risingEdgeXTriggered flag set by the corresponding ISR 120, and block 150 calculates the period of the PWM signal by subtracting the timestamp in the previousRisingEdgeXTime variable from that in the currentRisingEdgeXTime variable and storing the different in the periodX variable.

Block 152 next determines if the calculated period is equal to zero, and if so, passes control to block 154 to terminate the routine and return a false value. If, however, the calculated period is not equal to zero, block 152 passes control to block 156 to calculate the new reading, by subtracting the timestamp stored in the previousRisingEdgeXTime variable from that stored in the currentFallingEdgeXTime variable, dividing the difference by the value stored in the periodX variable, and storing the result in the pDutyCycleX variable. Block 158 then terminates the routine and returns a true value as a result, indicating that a new reading has been calculated and is stored in the pDutyCycleX variable.

Returning to block 142, if no rising edge has been triggered, control passes to block 160 to test the fallingEdgeXTriggered flag to determine if a new falling edge timestamp has been logged, and if so, control passes to block 162 to move the timestamp in the fallingEdgeXTime variable managed by the corresponding ISR 120 into the currentFallingEdgeXTime variable. Block 164 then clears the fallingEdgeXTriggered flag set by the corresponding ISR 120, and control passes to block 154 to terminate the routine and return a false value, indicating that a duty cycle calculation is still in progress. Returning to block 160, if neither the risingEdgeXTriggered flag nor the fallingEdgeXTriggered flag is set, control passes directly to block 154 to return a false value and terminate the routine. Thus, it will be appreciated that whenever routine 140 is called when no new edges have been captured, the routine need only check the risingEdgeXTriggered and fallingEdgeXTriggered flags and immediately return a false value to its calling routine.

Figure 9:
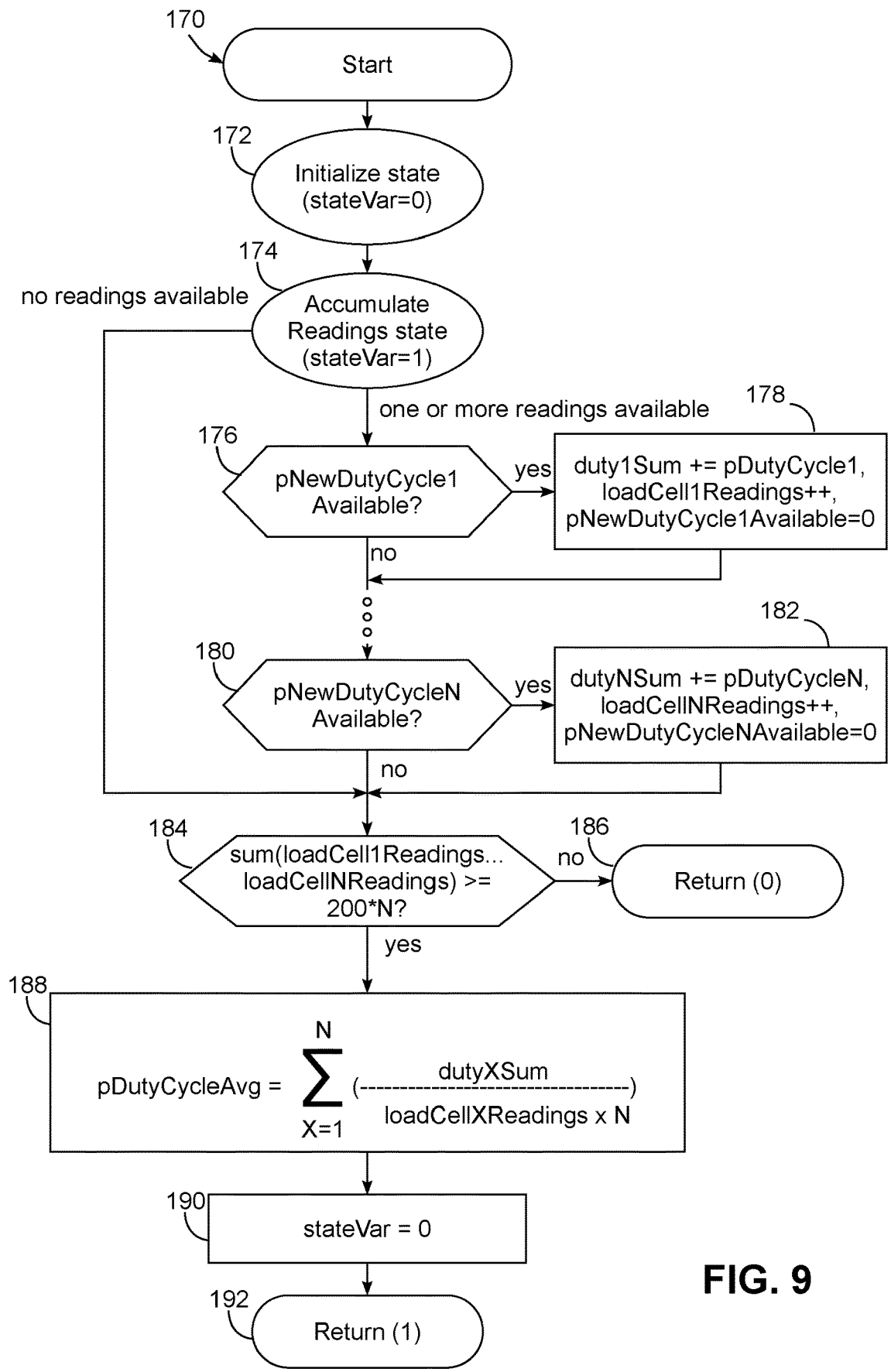
FIG. 9 is a flowchart illustrating an example sequence of operations for a tare routine capable of being used in the weight sensing system of FIG. 5.

FIG. 9 next illustrates a tare routine 170 that is capable of being used to sense the weight of an empty wash tub using the aforementioned weight sensing system 100, and generally when the wash basket is static (not moving). Routine 170 is illustrated as a state machine including two states controlled by a state variable (stateVar), an initialize state 172 (stateVar=0) and an accumulate readings state 174 (stateVar=1). Routine 170 performs a static long-time average of multiple readings to determine a tare value representative of the weight of the wash tub when empty. It has been found, for example, that 200 readings from each weight sensor may be sufficient in many embodiments, so routine 170 is used to log at least 200 readings from each weight sensor and average the results, although the invention is not so limited. It is generally desirable for the ProcessInputCaptureX routine 140 for each load cell/ICU to be called prior to calling routine 170, and routine 170 in the illustrated embodiment is configured to return a "1" value if the measurement is complete, and return a "0" value if the measurement is still in progress.

When a transition occurs to the initialize state 172, a set of variables are cleared, including a running sum value and a reading count value for each load cell/ICU, designated herein as dutyXSum and loadCellXReadings, respectively. Then, when it is desired to calculate a new tare value, the stateVar variable may be set to 1 to cause a state transition to occur to accumulate readings state 174. In this state, if one or more readings is available when the routine is called, control passes to blocks 176-182 to accumulate the new readings.

Block 176, for example, determines whether a new reading for load cell/ICU 1 is available, e.g., based upon a pNewDutyCycle1Available flag set based upon the result of the corresponding ProcessInputCapture1 routine 140, and if so, passes control to block 178 to perform three operations. First, the new reading stored in the pDutyCycle1 variable is added to the duty1Sum variable. Second, the loadCell1Readings variable is incremented. Third, the pNewDutyCycle1Available flag is cleared to indicate that the reading has now been incorporated into the calculation. If no new reading is available however, block 178 is bypassed.

Next, the operations performed in blocks 176 and 178 are repeated for each other load cell/ICU in the weight sensing system (represented by blocks 180 and 182), and after all of the available readings for all of the load cells/ICUs have been processed, control passes to block 184 to determine whether to total number of readings aggregated by the routine is greater than or equal to 200×N (the number of load cells/ICUs being used), indicating that at least 200 readings have been collected for each load cell/ICU. If not, the measurement is still in process, so control passes to block 186 to return a "0" value as the result.

If, however, a sufficient number of readings have been collected, control passes to block 188 to calculate a tare value and store that value in a pDutyCycleAvg variable. The tare value may be calculated, for example, by dividing the dutyXSum variable for each load cell/ICU by the loadCellXReadings variable for that load cell/ICU, and then summing the N results and dividing the total by N. Thereafter, in block 190 the stateVar variable is set to 0 and a state transition occurs back to the initialize state 172, and in block 192, the routine terminates and returns a "1" value as its result to indicate that the tare value calculation is now available.

Figure 10:
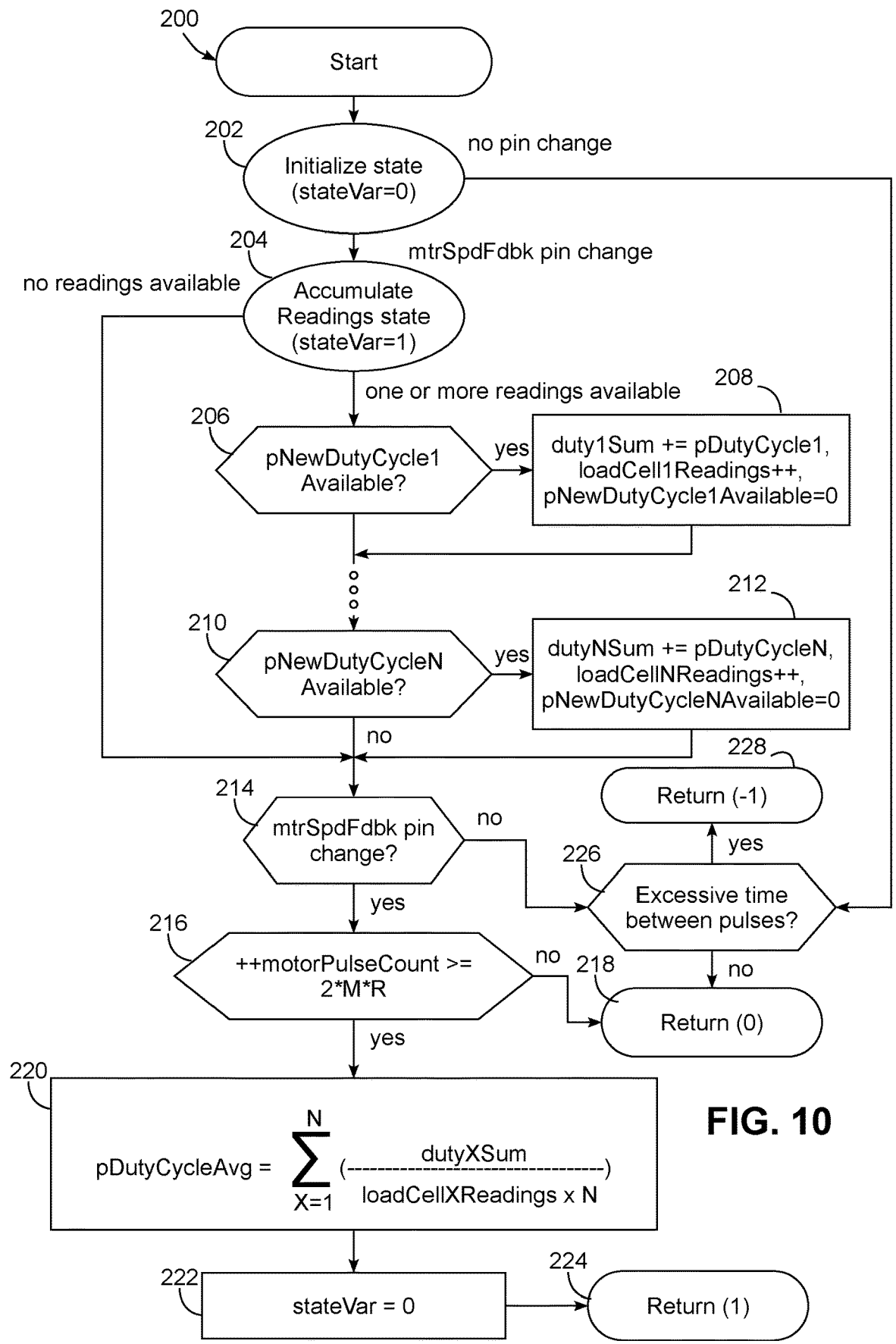
FIG. 10 is a flowchart illustrating an example sequence of operations for average weight over rotation routine capable of being used in the weight sensing system of FIG. 5.

Next, turning to FIG. 10, this illustrates an average weight over rotation routine 200 that is capable of being used in weight sensing system 100 to average readings over one or more complete rotations of the wash basket, and utilizing the motor speed input signal discussed above in connection with FIG. 5. The routine counts motor speed feedback pulses in order to average readings over a complete rotation, and in the illustrated embodiment, it is assumed that the motor is already be up to the desired speed before the routine is called. Similar to routine 170, it is generally desirable for the ProcessInputCaptureX routine 140 for each load cell/ICU to be called prior to calling routine 200, and routine 200 in the illustrated embodiment is configured to return a "1" value if the measurement is complete, return a "0" value if the measurement is still in progress, and return a "−1" value if an error occurs.

Routine 200 is illustrated as a state machine including two states controlled by a state variable (stateVar), an initialize state 202 (stateVar=0) and an accumulate readings state 204

(stateVar=1). Routine 200 determines an average of multiple readings over the course of one or more revolutions of wash basket to determine an average value representative of the weight of the wash tub during the rotation. When a transition occurs to the initialize state 202, a set of variables are cleared, including a running sum value and a reading count value for each load cell/ICU (similar to routine 170), as well as a motor pulse count value, designated herein as motorPulseCount.

A pin change, based on the mtrSpdFdbk pin, is used to check if the motor is running without error and to increment the motor pulse count value. Excessive time between pin changes may be indicative of an error, such that if an excessive time is detected, a return value of −1 will be returned. As such, when it is desired to calculate a new average value, the stateVar variable may be set to 1 to cause a state transition to occur to accumulate readings state 204. In this state, if one or more readings is available when the routine is called, control passes to blocks 206-212 to accumulate the new readings.

Block 206, for example, determines whether a new reading for load cell/ICU 1 is available, e.g., based upon a pNewDutyCycle1Available flag set based upon the result of the corresponding ProcessInputCapture1 routine 140, and if so, passes control to block 208 to perform three operations. First, the new reading stored in the pDutyCycle1 variable is added to the duty1Sum variable. Second, the loadCell1Readings variable is incremented. Third, the pNewDutyCycle1Available flag is cleared to indicate that the reading has now been incorporated into the calculation. If no new reading is available however, block 208 is bypassed.

Next, the operations performed in blocks 206 and 208 are repeated for each other load cell/ICU in the weight sensing system (represented by blocks 210 and 212), and after all of the available readings for all of the load cells/ICUs have been processed, control passes to block 214 to determine whether a motor speed feedback pulse has been detected, e.g., based on an edge detected on a mtrSpdFdbk pin. If so, control passes to block 216 to first increment the motorPulseCount variable and then test if the motorPulseCount variable is greater than 2×M×R (where M is the number of motor pulses in one full revolution of the wash basket, R is the number of full revolutions to collect the average over, and the 2 is used to accommodate the fact that there are both rising and falling edges associated with each motor pulse), indicating that a sufficient number of readings have been aggregated by the routine. If not, the measurement is still in process, so control passes to block 218 to return a "0" value as the result.

If, however, a sufficient number of readings have been collected, control passes to block 220 to calculate an average value and store that value in a pDutyCycleAvg variable. The average value may be calculated, for example, by dividing the dutyXSum variable for each load cell/ICU by the loadCellXReadings variable for that load cell/ICU, and then summing the N results and dividing the total by N. Thereafter, in block 222 the stateVar variable is set to 0 and a state transition occurs back to the initialize state 202, and in block 224, the routine terminates and returns a "1" value as its result to indicate that the average value calculation is now available.

Returning to block 214, if no edge has been detected, control passes to block 226 to determine whether an excessive time has passed between successive pulses (e.g., due to a broken wire, a motor stall, etc.), which indicates that the calculation most likely will not be completed. If not, control passes to block 218 to return a "0" value as the result, but if so, control passes to block 228 to return a "−1" result that is representative of an error condition. In addition, returning to state 202, if no pin change is detected when routine 200 is called, control may also pass to block 226 to capture any errors that may have occurred as a result of a failure to sense a motor pulse in an excessive period of time.

Figure 11:
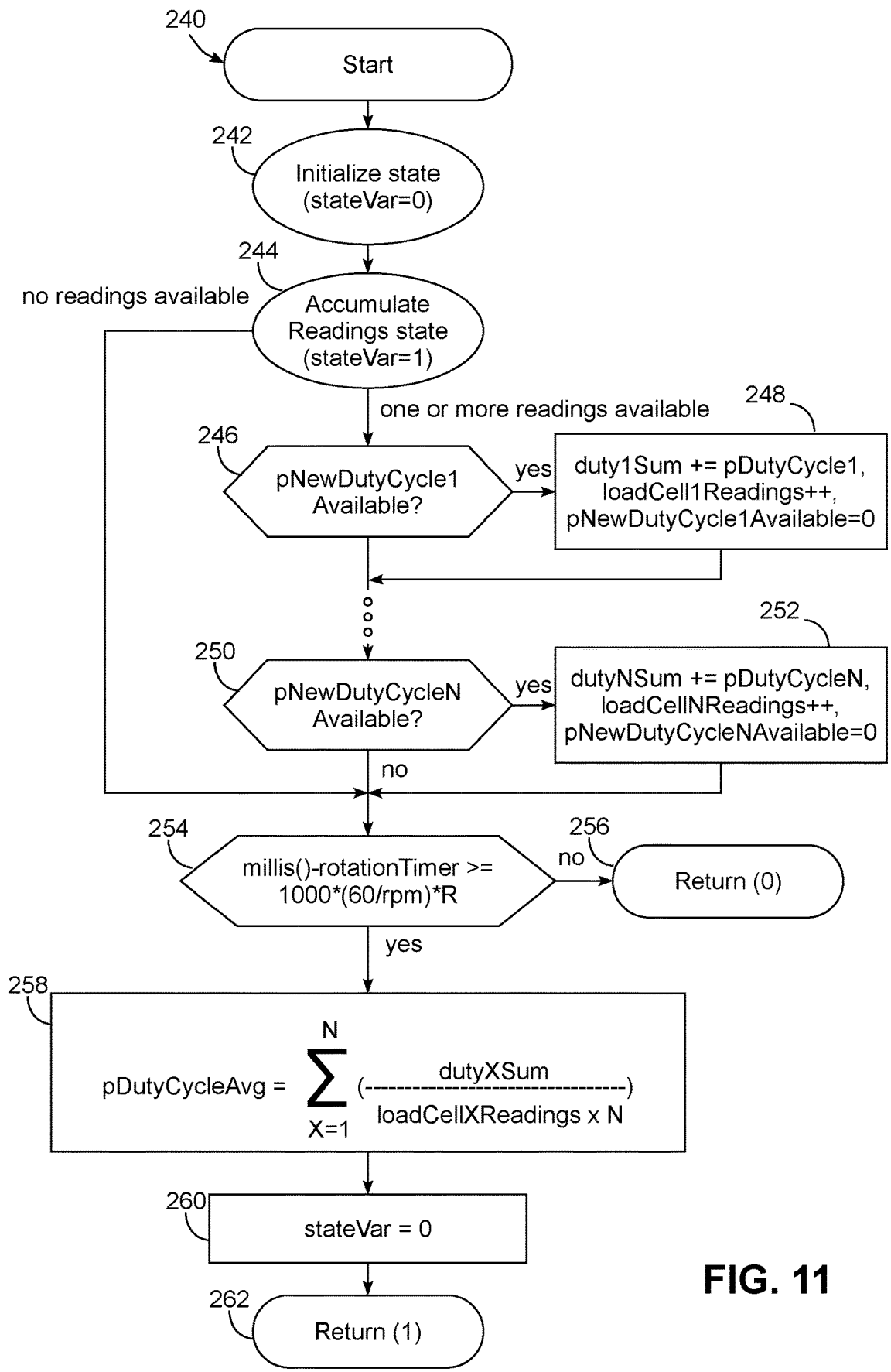
FIG. 11 is a flowchart illustrating an example sequence of operations for an open loop average weight over rotation routine capable of being used in the weight sensing system of FIG. 5.

Next, FIG. 11 illustrates an open loop average weight over rotation routine 240 that may be used as an alternative to routine 200, which rather than using motor speed feedback, uses an expected time of a full basket rotation based on a commanded speed to average readings over one or more complete rotations of the wash basket. Similar to routine 200, it is generally desirable for the ProcessInputCaptureX routine 140 for each load cell/ICU to be called prior to calling routine 240, and routine 240 in the illustrated embodiment is configured to return a "1" value if the measurement is complete, and return a "0" value if the measurement is still in progress.

Routine 240 is illustrated as a state machine including two states controlled by a state variable (stateVar), an initialize state 242 (stateVar=0) and an accumulate readings state 244 (stateVar=1). Routine 240 determines an average of multiple readings over the course of one or more revolutions of wash basket to determine an average value representative of the weight of the wash tub during the rotation, with the full rotation determined using a tracked rotation duration. When a transition occurs to the initialize state 242, a set of variables are cleared, including a running sum value and a reading count value for each load cell/ICU (similar to routine 170), as well as a rotationTimer that is initialized with a start time in milliseconds (e.g., as captured from a timer using a millis( ) function call). Then, when it is desired to calculate a new average value, the stateVar variable may be set to 1 to cause a state transition to occur to accumulate readings state 244. In this state, if one or more readings is available when the routine is called, control passes to blocks 246-252 to accumulate the new readings.

Block 246, for example, determines whether a new reading for load cell/ICU 1 is available, e.g., based upon a pNewDutyCycle1Available flag set based upon the result of the corresponding ProcessInputCapture1 routine 140, and if so, passes control to block 248 to perform three operations. First, the new reading stored in the pDutyCycle1 variable is added to the duty1Sum variable. Second, the loadCell1Readings variable is incremented. Third, the pNewDutyCycle1Available flag is cleared to indicate that the reading has now been incorporated into the calculation. If no new reading is available however, block 248 is bypassed.

Next, the operations performed in blocks 246 and 248 are repeated for each other load cell/ICU in the weight sensing system (represented by blocks 250 and 252), and after all of the available readings for all of the load cells/ICUs have been processed, control passes to block 254 to determine whether the elapsed rotation duration (determined by subtracting the rotationTimer variable from the current time in milliseconds (from the millis( ) function call) meets or exceeds the desired duration corresponding to one or more full revolutions of the wash basket, which is calculated as 1000*(60/rpm)*R, where rpm is the speed in revolutions per minute and R is the number of full rotations. If not, the measurement is still in process, so control passes to block 256 to return a "0" value as the result.

If, however, a sufficient number of readings have been collected, control passes to block 258 to calculate an average value and store that value in a pDutyCycleAvg variable. The average value may be calculated, for example, by dividing the dutyXSum variable for each load cell/ICU by the loadCellXReadings variable for that load cell/ICU, and then summing the N results and dividing the total by N. Thereafter, in block 260 the stateVar variable is set to 0 and a state transition occurs back to the initialize state 242, and in block 262, the routine terminates and returns a "1" value as its result to indicate that the average value calculation is now available.

The aforementioned routines may be used to measure various weights associated with a wash tub in different embodiments, e.g., tare weights associated with an empty wash tub, static weights captured while no basket rotation occurs, average weights captured while a basket undergoes one or more rotations, dry load weights (where a load has been added to the wash tub prior to adding water), water weights (where no load is present but water is in the wash tub, wet load weights (where both a load and water have been added to the wash tub), and weights indicative of an out-of-balance load (among others). It will also be appreciated that the weights may be collected using weight sensors configured in different locations in a laundry washing machine, e.g., connected to the suspension rods or other supports for the wash tub, connected to the entire housing of the laundry washing machine, or in other locations as will be appreciated by those of ordinary skill in the art having the benefit of the instant disclosure.

Figure 12:
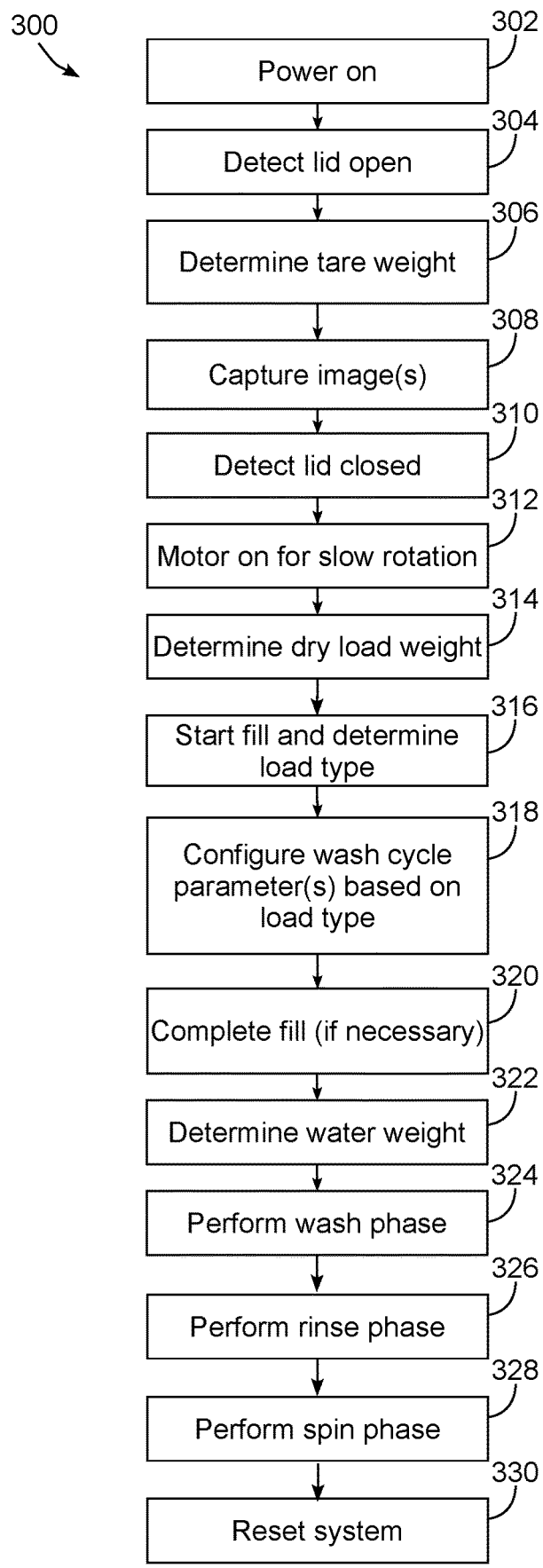
FIG. 12 is a flowchart illustrating an example sequence of operations for implementing a wash cycle in a laundry washing machine using the weight sensing system of FIG. 5.

Now turning to FIG. 12, this figure illustrates an example sequence of operations 300 for implementing a wash cycle in a laundry washing machine using weight sensing system 100 of FIG. 5. A typical wash cycle includes multiple phases, including an initial fill phase where the wash tub is initially filled with water, a wash phase where a load that has been placed in the wash tub is washed by agitating the load with a wash liquor formed from the fill water and any wash products added manually or automatically by the washing machine, a rinse phase where the load is rinsed of detergent and/or other wash products (e.g., using a deep fill rinse where the wash tub is filled with fresh water and the load is agitated and/or a spray rinse where the load is sprayed with fresh water while spinning the load), and a spin phase where the load is spun rapidly while water is drained from the wash tub to reduce the amount of moisture in the load.

It will be appreciated that wash cycles can also vary in a number of respects. For example, additional phases, such as a pre-soak phase, may be included in some wash cycles, and moreover, some phases may be repeated, e.g., including multiple rinse and/or spin phases. Each phase may also have a number of different operational settings that may be varied for different types of loads, e.g., different times or durations, different water temperatures, different agitation speeds or strokes, different rinse operation types, different spin speeds, different water amounts, different wash product amounts, etc.

In embodiments consistent with the invention, a load type may be automatically and dynamically selected during such a wash cycle, and based at least in part on one or more weights sensed by the weight sensing system. In sequence 300, for example, power on of the laundry washing machine may be performed in block 302, e.g., based upon user selection of a power button, and in block 304, an open lid may be detected. At this time, a tare weight, representative of the weight of an empty tub, may be determined in block 306, e.g., using routine 170 of FIG. 9. Next, in some embodiments, one or more images of the load may then be captured in block 308, with the image(s) used to determine a color composition of the load. Then, in block 310 closing of the lid may be detected. Next, the motor that drives the wash basket may be turned on for slow rotation (block 312) and once the motor reaches a steady state speed, a dry load weight may be determined over one or more full revolutions (block 314), e.g., using routine 200 of FIG. 10 or routine 240 of FIG. 11.

In some embodiments, for example, a load weight may be calculated from N load cells using the following equation:

LoadWeight(lbs)=(LoadCellDutyCycleAverage(%)/2 [%/kg])*(4/N)*2.205 [lbs/kg])

Next, an initial fill phase may be initiated in block 316 in order to determine a load type, e.g., based at least in part on multiple times determined based upon various fluid levels sensed by a fluid level sensor during and after the dispensation of water into the wash tub. In some embodiments, the automatic and dynamic selection may be performed in response to user selection of a particular mode (e.g., an "automatic" mode), while in other embodiments, automatic and dynamic selection may be used for all wash cycles. In still other embodiments, automatic and dynamic selection may further be based upon additional input provided by a user, e.g., soil level, article type, fabric type, article durability, etc. The dynamic selection may be based in part on judging the absorptivity of the fabric in the load against the weight of the load. A dry weight may be determined for the load in some embodiments at the beginning of a washing cycle (e.g., at the beginning of the fill phase) using a weight sensor and prior to dispensing any water into the wash tub. Thereafter, water may be dispensed into the wash tub (e.g., by spraying the load to saturate the fabrics in the load), and fluid levels sensed by a fluid level sensor while dispensing water into the wash tub as well as after water dispensing has been paused or stopped may be used to determine multiple times that may be compared against various load type criteria to select a load type from among a plurality of different load types. The load type may then be used, for example, to determine if and how much additional water should be added for the initial fill, as well as other operational settings for the wash cycle.

In some embodiments, a first time at which the fluid level reaches a predetermined fluid level while dispensing water into the wash tub and a peak time at which the fluid level stabilizes after the dispensing of water into the wash tub has been stopped or paused may be used to categorize a load into one of multiple load types, as both times are affected in part by the absorbency of the articles in a load. In some instances, the first time alone may be able to categorize some loads, as, for example, the first time may be relatively short for loads containing only low absorbency fabrics such as polyesters and other synthetic materials, or may be relatively long for loads containing highly absorbent articles or fabrics such as cotton articles, bedding or towels. By incorporating the peak time into the determination, however, it has been found that additional loads may be appropriately categorized, e.g., loads where absorbency is such that the first time alone is unable to suitably categorize the load. In addition, in some embodiments, the first time may be a sense time where water is first detected by a fluid level sensor, and an additional time, e.g., a fill time at which the fluid level reaches another predetermined fluid level such as a desired minimum fill level while dispensing water into the wash tub, may also be incorporated into the determination to categorize additional loads. The dry weight of the load may also factor into the dynamic detection of load type, e.g., by determining appropriate criteria against which the times are compared when determining whether a load is appropriately categorized into a particular load type. Additional details regarding the use of such times and the sensed dry weight to determine load type may be found in the aforementioned U.S. patent application Ser. No. 16/893,328, which has been incorporated by reference herein.

Next, in block 318, the wash cycle is configured based upon the determined load type. Then, block 320 optionally dispenses an additional amount of water to complete the fill phase. For example, the additional amount of water may be selected to provide a total amount of dispensed water selected based upon load type or selected via a separate load size selection by the user. Thereafter, in block 322, a water weight may also be determined, e.g., using any of the aforementioned routines 170, 200 or 240, to determine the amount of water used during a cycle before the wash and rinse phases. The water weight may be calculated, for example, using the following equation (with N being the number of load cells being used):

$$\text{WaterWeight(gal)} = (\text{LoadCellDutyCycleAvg (\%)}/2[\%/\text{kg}]) * (4/N) * 0.2647 \text{ [gal/kg]}$$

The wash cycle thereafter proceeds with one or more wash phases (block 324) one or more rinse phases (block 326) and one or more spin phases (block 328), with various operational settings in one or more of the phases controlled at least in part based on load type. The wash cycle is then complete, and the system is reset (block 330).

Various additional modifications may be made to the illustrated embodiments consistent with the invention. Therefore, the invention lies in the claims hereinafter appended.

What is claimed is:

1. A laundry washing machine, comprising:
a wash tub disposed within a housing;
a weight sensor positioned to sense at least a portion of a weight associated with the wash tub, the weight sensor configured to output an associated pulse width modulated (PWM) force signal having a duty cycle that varies with applied force on the weight sensor; and
a controller including a state change sensing logic circuit coupled to receive the PWM force signal from the weight sensor and generate an interrupt in response to each of a plurality of state transitions in the PWM force signal, the controller configured to determine the weight associated with the wash tub using a force value generated from the PWM force signal output by the weight sensor, wherein the controller is configured to generate the force value by:
executing an interrupt service routine triggered by each interrupt to capture a timestamp associated with each of the plurality of state transitions; and
calculating a duty cycle of the PWM force signal using the captured timestamps of the plurality of state transitions.

2. The laundry washing machine of claim 1, wherein the controller includes a processor integrated circuit, and wherein the state change sensing logic circuit includes an input capture unit (ICU) disposed on the processor integrated circuit.

3. The laundry washing machine of claim 2, wherein the input capture unit includes a port coupled to receive the PWM force signal and timer, wherein the input capture unit is configured to generate the interrupt in response to detecting a rising or falling edge of the PWM force signal at the port, and wherein the input capture unit is configured to store a current time of the timer in an input capture register as the timestamp in response to detecting the rising or falling edge of the PWM force signal.

4. The laundry washing machine of claim 2, further comprising:
a motor configured to rotate a wash basket in the wash tub, the motor further configured to output a speed signal; and
a motor speed conditioning circuit coupled to an input of the controller and the output of the motor and configured to condition the speed signal to reduce noise in the speed signal.

5. The laundry washing machine of claim 2, wherein the weight sensor is a first weight sensor among a plurality of weight sensors respectively positioned to sense at least a portion of the weight associated with the wash tub and output respective PWM force signals, wherein the input capture unit is a first input capture unit among a plurality of input capture units disposed on the processor integrated circuit and respectively configured to generate interrupts in response to state transitions in the respective PWM force signals, and wherein the interrupt service routine is a first interrupt service routine among a plurality of interrupt service routines respectively associated with the plurality of weight sensors.

6. The laundry washing machine of claim 5, wherein the wash tub is supported by a plurality of suspension rods, and wherein each of the plurality of weight sensors is a load cell coupled to a respective suspension rod among the plurality of suspension rods.

7. The laundry washing machine of claim 1, wherein the controller is configured to calculate the duty cycle of the PWM force signal using the captured timestamps of the plurality of state transitions by:
tracking each of a current rising edge timestamp, a previous rising edge timestamp, and a falling edge timestamp;
determining a period by determining a first difference between the current rising edge timestamp and the previous rising edge timestamp; and
determining the duty cycle by determining a second difference between the falling edge timestamp and the previous rising edge timestamp and dividing the second difference by the period.

8. The laundry washing machine of claim 7, wherein the interrupt service routine is configured to:
in response to a first interrupt associated with a rising edge state transition, store a first timestamp in a rising edge timestamp variable and set a rising edge triggered flag; and
in response to a second interrupt associated with a falling edge state transition, store a second timestamp in a falling edge timestamp variable and set a falling edge triggered flag;
wherein tracking each of the current rising edge timestamp, the previous rising edge timestamp, and the falling edge timestamp, determining the period, and determining the duty cycle are performed in a process input capture routine executed by the controller and configured to test each of the rising edge triggered flag and the falling edge triggered flag to determine whether to update any of the current rising edge timestamp, the previous rising edge timestamp, and the falling edge timestamp.

9. The laundry washing machine of claim 8, wherein the process input capture routine is configured to be executed as a periodic background routine by the controller.

10. The laundry washing machine of claim 9, wherein the process input capture routine is configured to return a first value in response to determining a new duty cycle during execution of the process input capture routine and to otherwise return a second value that indicates that determination of the new duty cycle is still in progress.

11. The laundry washing machine of claim 1, wherein the plurality of state transitions is a first plurality of state transitions, wherein the controller is further configured to determine a tare weight for the wash tub by:
  determining a plurality of force values over time based upon a plurality of interrupts generated in response to a second plurality of state transitions; and
  averaging the plurality of force values.

12. The laundry washing machine of claim 1, further comprising a rotatable wash basket disposed in the wash tub, wherein the plurality of state transitions is a first plurality of state transitions, and wherein the controller is further configured to determine a weight of a load disposed in the wash tub by:
  rotating the rotatable wash basket;
  determining a plurality of force values over time based upon a plurality of interrupts generated in response to a second plurality of state transitions during rotation of the rotatable wash basket; and
  averaging the plurality of force values.

13. The laundry washing machine of claim 12, wherein determining the plurality of force values includes determining the plurality of force values over one or more full rotations of the rotatable wash basket such that averaging of the plurality of force values is taken over the one or more full rotations.

14. The laundry washing machine of claim 13, further comprising receiving a speed signal from a motor coupled to the wash basket, wherein determining the plurality of force values over the one or more full rotations of the rotatable wash basket includes:
  accumulating force values for a first rotation of the wash basket until completion of the first rotation is detected using the speed signal; and
  averaging the accumulated force values.

15. The laundry washing machine of claim 13, further comprising tracking a rotation duration, wherein determining the plurality of force values over the one or more full rotations of the rotatable wash basket includes:
  accumulating force values for a first rotation of the wash basket until completion of the first rotation is detected using the rotation duration; and
  averaging the accumulated force values.

16. The laundry washing machine of claim 12, wherein the controller is configured to determine the weight of the load disposed in the wash tub as a dry load weight prior to dispensing water into the wash tub.

17. The laundry washing machine of claim 12, wherein the controller is configured to determine the weight of the load disposed in the wash tub as a water weight after dispensing water into the wash tub.

18. The laundry washing machine of claim 12, wherein the controller is configured to dynamically select a load type using the determined weight of the load, and control a wash or rinse temperature, a wash or rinse water amount, an agitation duration, an agitation stroke, a soak duration, a spin speed, a spin duration, a cycle time, or a number of phase repeats in response to the selected load type.

19. The laundry washing machine of claim 12, wherein the controller is configured to detect an out-of-balance condition using the generated force value.

20. A laundry washing machine, comprising:
  a wash tub disposed within a housing;
  first and second load cells positioned to sense at least a portion of a weight associated with the wash tub, the first and second load cells configured to output respective first and second pulse width modulated (PWM) force signals having duty cycles that vary with applied force; and
  a controller including first and second input capture units respectively coupled to receive the first and second PWM force signals from the first and second load cells and generate respective first and second pluralities of interrupts in response to state transitions in the first and second PWM force signals, the controller configured to determine the weight associated with the wash tub using first and second force values generated respectively from the first and second PWM force signals output by the first and second load cells, wherein the controller is configured to:
    generate the first force value by executing a first interrupt service routine triggered by the first plurality of interrupts to capture timestamps associated with state transitions of the first PWM force signal and calculating a first duty cycle of the first PWM force signal using the captured timestamps associated with the state transitions of the first PWM force signal; and
    generate the second force value by executing a second interrupt service routine triggered by the second plurality of interrupts to capture timestamps associated with state transitions of the second PWM force signal and calculating a second duty cycle of the second PWM force signal using the captured timestamps associated with the state transitions of the second PWM force signal.

* * * * *